Jan. 12, 1937. L. H. VOLD Re. 20,243
DEFROSTING MECHANISM
Original Filed May 10, 1928 2 Sheets-Sheet 1
Fig. 1
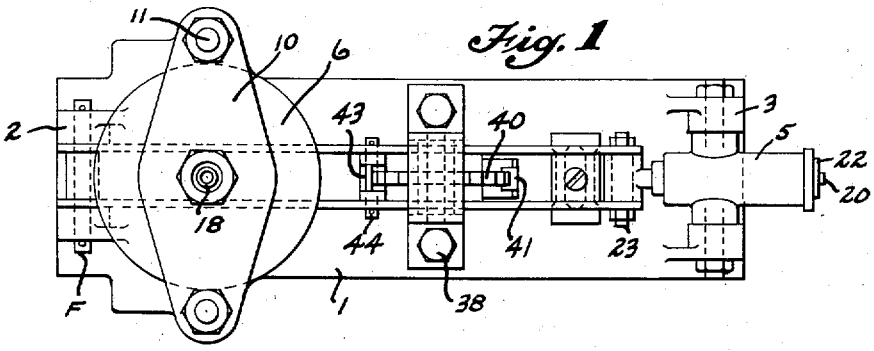
Fig. 3
Fig. 4
Fig. 2
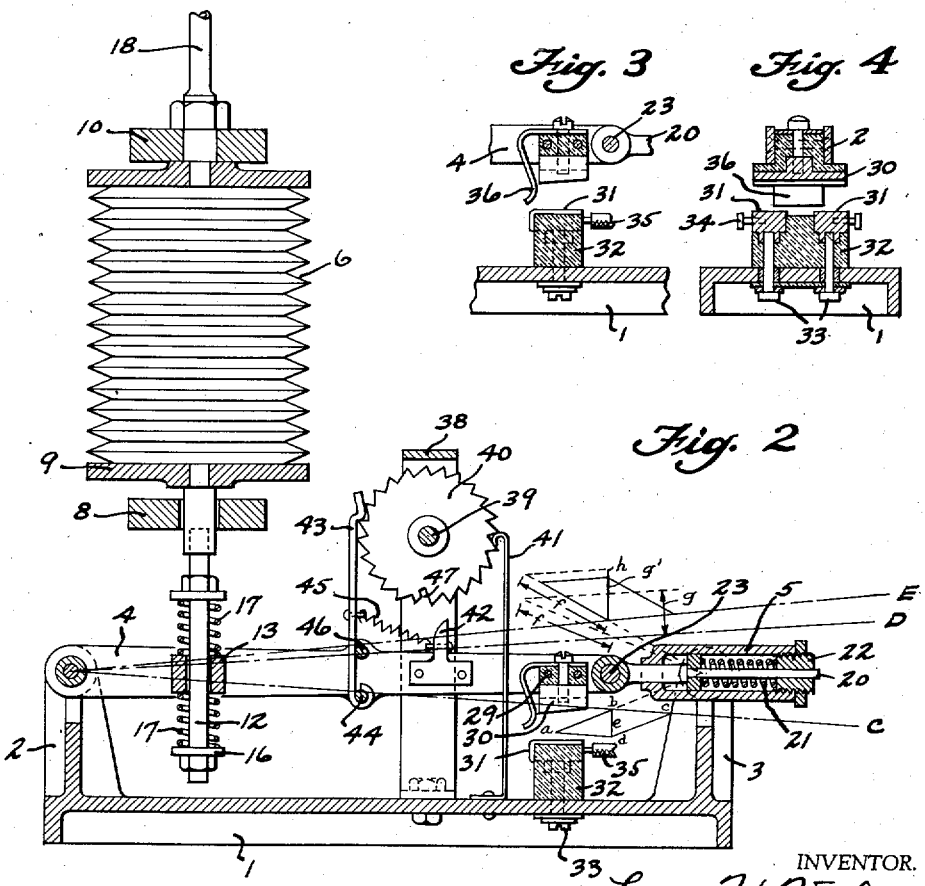
INVENTOR.
Lars H Vold
BY
Faust F Crampton
HIS ATTORNEY.

Jan. 12, 1937. L. H. VOLD Re. 20,243

DEFROSTING MECHANISM

Original Filed May 10, 1928 2 Sheets-Sheet 2

INVENTOR.
Lars H Vold
BY
Faust F Crampton
HIS ATTORNEY.

Reissued Jan. 12, 1937 Re. 20,243

UNITED STATES PATENT OFFICE 20,243

DEFROSTING MECHANISM

Lars H. Vold, Butler, Pa., assignor to Faust F. Crampton, Toledo, Ohio

Original No. 1,833,544, dated November 24, 1931, Serial No. 276,534, May 10, 1928. Application for reissue November 21, 1933, Serial No. 699,096

14 Claims. (Cl. 62—4)

This invention relates to electrically operated refrigerators and more particularly to apparatus for securing automatic defrostation of the refrigerator freezer at predetermined timed intervals.

In refrigeration, a refrigerant, as for example sulphur-dioxide, is employed and the process of freezing consists of letting the liquid refrigerant boil in the freezer thereby consuming heat which is taken from the freezing chamber. After the refrigerant has boiled in the freezer, it is in a gaseous form and is compressed and transmitted to a condenser where it is again liquefied and ready for use. This is the general principle of operation of all refrigerating machines. The refrigerant boils at a certain temperature under a certain pressure and the greater the pressure the greater will be the heat required for boiling.

In the present invention I utilize the variations in pressure as a means for regulating the operation of the compressor, and since as explained, the temperature requirements vary with the pressure to which the refrigerant is subjected, it is possible to control the temperature at which the refrigerant will boil, indirectly, by controlling the pressure.

Figure 5:
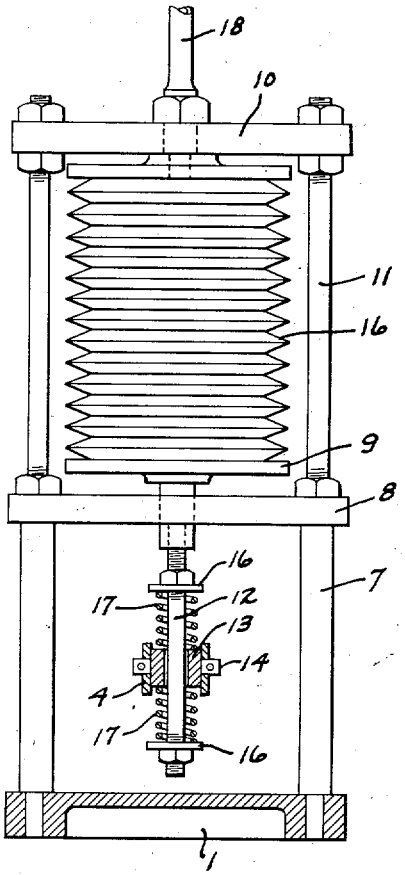
Figure 6:
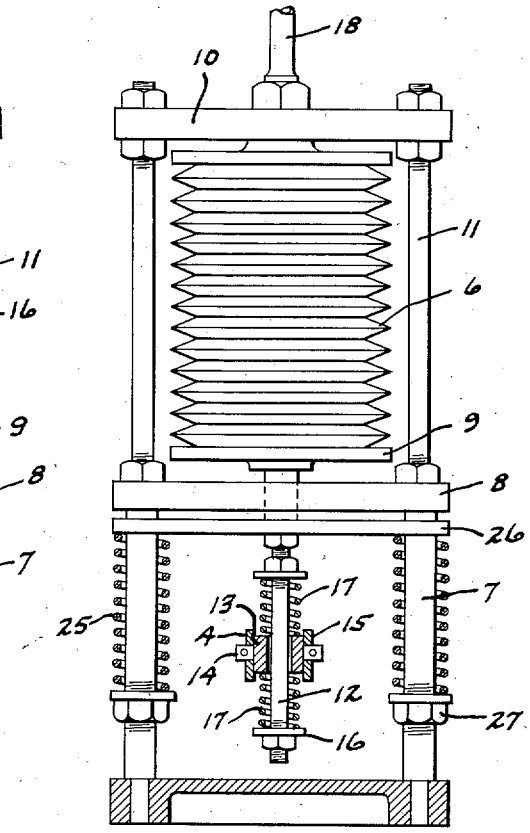

In the accompanying drawings constituting a part hereof and in which like reference characters designate like parts, Fig. 1 is a plan view of an operating mechanism embodying a snap switch and pressure responsive device which cooperate in accordance with the principles of my invention; Fig. 2 is a sectional elevational view thereof; Fig. 3 is a modification of the make and break contacts employed in the switch shown in Fig. 2; Fig. 4 is a section through the make and break contacts; Fig. 5 is an end elevational view of the pressure responsive device; Fig. 6 is a similar view of a modification thereof; and Fig. 7 shows a refrigerating system including the control means or switch.

Figure 7:
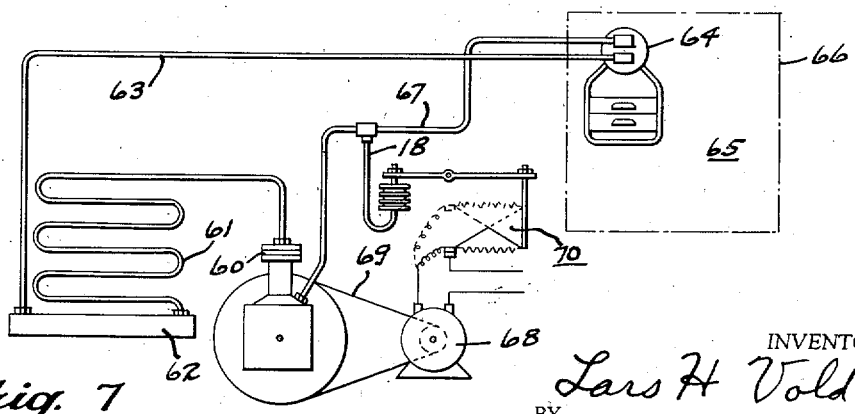

Referring to the drawings and more particularly to Fig. 7, there is shown a refrigerating system comprising a refrigerant liquefying apparatus having a compressor 60 for compressing the refrigerant and for forwarding the compressed refrigerant to the condenser 61 where the compressed refrigerant is liquefied and collected in the receiver 62. From the receiver the compressed refrigerant is forwarded through the supply conduit 63 to a freezer or evaporator 64, preferably of the float controlled flooded type, located within the food storage compartment 65 of a refrigerator cabinet 66. The liquid refrigerant within the evaporator 64, absorbs heat from the air within the food compartment 65 and evaporates, this vapor being returned to the compressor 60 through the return conduit 67. The compressor 60 is driven by an electric motor 68 through pulley and belt means 69.

In order to control the operation of the system and to maintain proper evaporator temperatures, I provide a control means generally designated by the reference character 70 which controls the operation of the electric motor 68 and the refrigerating system. The control means by its connecting tube 18 is operated and controlled by the pressure in the return conduit which is substantially the same as the pressure within the evaporator and is proportional and responsive to the temperature of the evaporator. The normal operation of the system causes frost to accumulate upon the surfaces of the evaporator and this, I desire to remove automatically at periodic intervals since it reduces the efficiency of the system.

Referring to Fig. 2 of the drawings, the structure therein illustrated comprises a bed plate 1 having end brackets 2 and 3 on which are pivotally mounted a switch lever 4 and a spring box 5.

As shown in Figs. 5 and 6, an elastic bellows 6 is supported on the bed plate 1 by rods 7 which support a block 8 that constitutes an abutment for one of the end plates 9 of the bellows and a block 10 is held in suitably spaced relation by studs 11 which may constitute an extension of the rod 7 or be separately bolted to the block 8. The end plate 9 of the bellows 6 is provided with a rod 12 that is operatively disposed in a swivel block 13 having trunnions 14 which engage the switch lever 4 and the rod 12 is further provided with flanged nuts 16 which constitute abutments for coil spring 17 which rest against the swivel block 13. The upper end of the bellows is provided with a conduit or suction line 18 leading to the low pressure side of the compressor which compresses the gaseous refrigerant after boiling in the freezing chamber. The bellows 6 expands and contracts in accordance with the pressure in the line 18 which is the pressure in the freezer. In the axial movement of the bellows rod 12 energy is stored up in the coil springs 17 in accordance with the resistance to movement of the switch lever 4 which is regulated by the spring box 5 in which a plunger 20 is biased by a coil spring 21, the tension of which is adjustable by a nut 22. The rod 20 is pivotally joined at 23 to the end of the switch lever 4. By adjusting the tension of spring 21 the switch lever 4 is operated in response to pressure in the bellows 6, but on account of the coil spring 17 storing up the energy necessary for tripping the switch lever, variations in pressure are permissible in the bellows 6 within certain ranges without affecting the position of the switch lever 4.

In Fig. 6 I have provided adjustable coil springs 25 on the rods 7, the springs resting against the plate 26 that is movable with the rod 12 and the tension of springs 25 is varied by the adjusting nuts 27 for a purpose to be hereinafter explained.

Again referring to Fig. 2 of the drawings, the switch lever 4 is provided with an insulating block 29 having a contact element 30 secured thereto which cooperates with a pair of terminal blocks 31 mounted on a block 32 of insulating material that is fastened to the bed plate 1 by bolts 33. When the contacts are made a circuit is established between the terminal blocks 31 which are provided with terminals 34 to which an electrical conductor 35 is attached, this conductor including in its circuit an electrical motor for operating the compressor or pump of the refrigerating machine.

As shown in Fig. 3 of the drawings, a spring catch 36 may be provided on the switch lever 4 which functions to continue the contact with the terminal blocks 31 if the main contact block 30 and the terminal blocks 31 should be slightly separated before the switch snaps over.

Mounted on the base 1 is a supporting frame 38 carrying a stud 39 on which is rotatably mounted a ratchet wheel 40. A spring arm 41 is mounted on the bed plate as shown and constitutes a fixer for the ratchet wheel 40. A prong 42 is fastened to the switch lever 4 and is adapted to engage the teeth of the ratchet wheel and a catch 43 is pivotally connected at 44 to the switch lever 4 and is biased by a tension spring 45 against a stop 46 carried by the lever 4. As illustrated, the ratchet wheel is provided with teeth of uniform pitch and depth with the exception of the space 47 which is of a greater depth than the remaining teeth of the wheel for a purpose to be hereinafter explained.

The operation of the device is briefly as follows:

Assuming that the switch lever 4 is in the position indicated by the line F—C to which it was brought by pressure in the bellows 6 which corresponds to the pressure in the freezer to which it is connected by the suction line 18. In this position the motor driving the compressor will be energized, since in this position of the switch lever, contact is made between the members 30 and 31 and the motor circuit established. The pressure in the freezer will fall and the bellows will begin to contract storing up energy in the bottom spring which will begin to exert a force against the swivel block 13. This building of pressure against the swivel block will constitute force *e* shown in the parallelogram of forces which will overcome the resultant force of the spring box 5 at which time the switch lever 4 will snap over to the position indicated by the line F—D. The prong 42 will engage a tooth of the ratchet wheel 40 in the upward movement of the lever 4 and as the contact of members 30 and 31 will be broken, the motor will be open circuited and de-energized. The freezer will then heat up and the pressure will rise and the switch mechanism will become responsive to the increased pressure through the bellows 6 exerting pressure against the switch lever 4 in the reverse direction.

The building up of pressure against the switch lever will continue until the force *g* which is equivalent to the spring pressure against the lever, will overcome the resultant force of the spring box and again the lever will snap to its contact making position, and in doing so, the catch 43 will engage a tooth of the ratchet wheel 40 and index it around one tooth space. The spring box 5 with its spring 21 is illustrated as one form of restraining means which may be replaced by other means such as an adjustable counterweight for example. The spring box may produce variable pressure for different elongations of the spring 21 depending upon the length of the spring box and the number of coils in the spring. The counterweight would be theoretically correct as it is constant.

The spring arm 41 serves to closely center the ratchet and during the next stroke of the switch lever 4 the depression 47 of the ratchet wheel is brought into alinement with the prong 42 against which it must seat.

When the lever 4 next snaps to its contact breaking position, it will assume the position indicated by the line F—E at which position spring box 5 and lever 4 will assume a different angle and, as seen from the diagram of forces, the force *g* or *g'*, which are ordinary forces, will be insufficient to overcome the resultant force of spring box 5. The force of spring box 5 being *f* or *f'*, they are substantially equal since they are both established by the spring 21. Both the forces *g* and *g'* are equivalents of spring pressure against the swivel 13 around the fulcrum F by the switch lever 4 under ordinary operating conditions, but in order to overcome the spring box with the lever in the position produced by the deep tooth 47 of the ratchet wheel, an additional pressure *h* must be added to *g'* or, in other words, the equivalent pressure of *g'* and *h* must be exerted against the swivel 13 by the spring 17 before the lever 4 will snap back. Since such a force as will store up sufficient pressure in the spring 17 to snap the lever back from its position F—E can be produced only through the expansion of the bellows 6, a higher temperature must prevail in the freezer than that ordinarily available to produce the force necessary to snap back the switch lever to its contact making position.

By varying the relative depths of the tooth 47 and the remaining teeth of the ratchet wheel, the F—E position of the lever 4 can be established to be responsive to pressures corresponding to a given temperature in the freezer, as for example 34 degrees which would defrost the tubes or diaphragm as the case may be.

With a switch and pressure responsive operating mechanism, as herein illustrated and described, defrostation of the freezer will take place at predetermined cycles, as for example, once every 24 cycles or more, depending upon the number of teeth in the ratchet wheel, and the defrostation is therefore automatic and positively accomplished.

Referring to Fig. 6, the adjustable springs 25 may be employed to produce an adjustment whereby a certain amount of pressure in the bellows is permitted without producing an effective force on the coil springs 17. For example, in the illustration the space between the plate 26 and block 8 may be taken up at atmospheric pressure by simply adjusting the nuts 27.

Although one embodiment of the invention has been herein illustrated and described, it will be obvious to those skilled in the art that various modifications may be made in the details of construction without departing from the principles herein set forth.

I claim herein as my invention:

1. A switch mechanism for a refrigerating system comprising a switch lever, power means connected to said switch lever responsive to fluid pressure, and energy storing means also connected to said lever, a ratchet wheel the teeth of which constitute an abutment for the switch lever, said ratchet wheel being rotated by the movement of the switch lever whereby a new abutment is provided for said lever, for each operating cycle of the switch.

2. Apparatus as set forth in claim 1 in which the ratchet wheel is provided with teeth of different depths to constitute differently located abutments for the switch lever.

3. Apparatus as set forth in claim 1 in which the switch lever is provided with tension means adapted to hold it against the abutments of said ratchet wheel, and in which the teeth of the ratchet wheel are of different depths whereby the switch lever is held in different positions by its tension means.

4. In a refrigerating system including an evaporator and a liquefying unit for withdrawing gaseous refrigerant from and supplying liquid refrigerant to the evaporator, automatic means for starting the operation of said liquefying unit at a definite temperature limit for a predetermined number of times, and automatic means operative after said predetermined number of times for preventing the operation of said starting means until a temperature higher than said predetermined temperature has been reached in said evaporator.

5. In a refrigerating system including an evaporator and a liquefying unit for withdrawing gaseous refrigerant from and supplying liquid refrigerant to the evaporator, a switch for starting the operation of said liquefying unit at a definite temperature limit for a predetermined number of times, and automatic means operative after said predetermined number of times for preventing the operation of said switch periodically for permitting a higher than said predetermined temperature limits.

6. A refrigerating means comprising a cooling unit, means for circulating a refrigerant medium through said unit, a switch for controlling said circulating means, means for adjusting said switch to maintain a predetermined temperature in said cooling unit, and means operated by said switch for periodically affecting the adjustment of said switch to produce a different temperature in said evaporator, said last named means being further operated by said switch to return the system to the normal control of said control means.

7. A refrigerating system comprising an evaporator, means for circulating a refrigerant through said evaporator, means for starting and stopping said circulating means, said last named means including a control device having a pressure responsive device adapted to expand and contract, and a ratcheting means operated by the expansion of said pressure means for periodically operating upon said control device to cause said control device to produce a different temperature in said evaporator, said ratcheting means being further operated by the expansion of said pressure operated means to return said system to the normal control of said control means.

8. Refrigerating apparatus including a cooling unit, means for circulating a refrigerant medium through the cooling unit, control means dependent upon predetermined high and low normal temperatures of the cooling unit for normally controlling the stopping and starting of the circulation of the refrigerant medium to provide refrigeration cycles, and means including a cycle counting device effective after a predetermined number of successive refrigeration cycles for adjusting the control means to vary the circulation of the refrigerant medium.

9. Refrigerating apparatus including a cooling unit, means for circulating a refrigerant medium through the cooling unit, control means dependent upon predetermined high and low normal temperatures of the cooling unit for normally controlling the stopping and starting of the circulation of the refrigerant medium to provide refrigeration cycles, and a cycle counting means effective after a predetermined number of successive refrigeration cycles for periodically stopping the circulation of refrigerant medium for an abnormal length of time.

10. In a refrigerating system including an evaporator and a liquefying unit for withdrawing gaseous refrigerant from and supplying liquid refrigerant to the evaporator, automatic means for starting and stopping the operation of said liquefying unit at definite high and low evaporator temperature limits respectively for a predetermined number of times, and means automatically operative after said predetermined number of times for preventing the operation of said starting and stopping means until a different temperature has been reached in said evaporator.

11. In a refrigerating system including an evaporator and a liquefying unit for withdrawing gaseous refrigerant from and supplying liquid refrigerant to the evaporator, automatic means for starting and stopping the operation of said liquefying unit at definite high and low temperatures respectively for a predetermined number of times, and means automatically operative after said predetermined number of times for preventing the operation of said switch periodically for permitting temperatures beyond said predetermined temperatures.

12. A switch means including a set of switch contacts, pressure operated means for opening and closing said switch contacts at predetermined low and high pressures of the pressure operated means, a ratcheting device operated by said pressure operated means for changing the pressure at which the pressure operated means closes the switch contacts.

13. A switch means including a bellows, a set of switch contacts opened and closed by the bellows, means for resisting the movement of the bellows to control the pressures applied to the bellows at which the switch contacts are normally opened and closed, a pawl and ratcheting device operated by the bellows for periodically increasing the resistance to the movement of the bellows to change the relation between the pressure applied to the bellows and the operation of the switch contacts.

14. Refrigerating apparatus including a cooling unit, means for circulating a refrigerant medium through the unit, means responsive to the temperature of the cooling unit for controlling the starting and stopping of the circulation of refrigerant medium through the unit, means for resisting the operation of the temperature responsive means to control the relation between the starting and stopping of the circulation and the temperature of the cooling unit, and a ratcheting device operated by said temperature responsive means for changing the relation between the temperature of the cooling unit and the starting of the circulation of refrigerant medium in the cooling unit.

LARS H. VOLD.